Oct. 26, 1954     A. P. KRUEGER     2,692,436
TAPE-DISPENSING MECHANISM
Filed Nov. 10, 1950     4 Sheets-Sheet 1
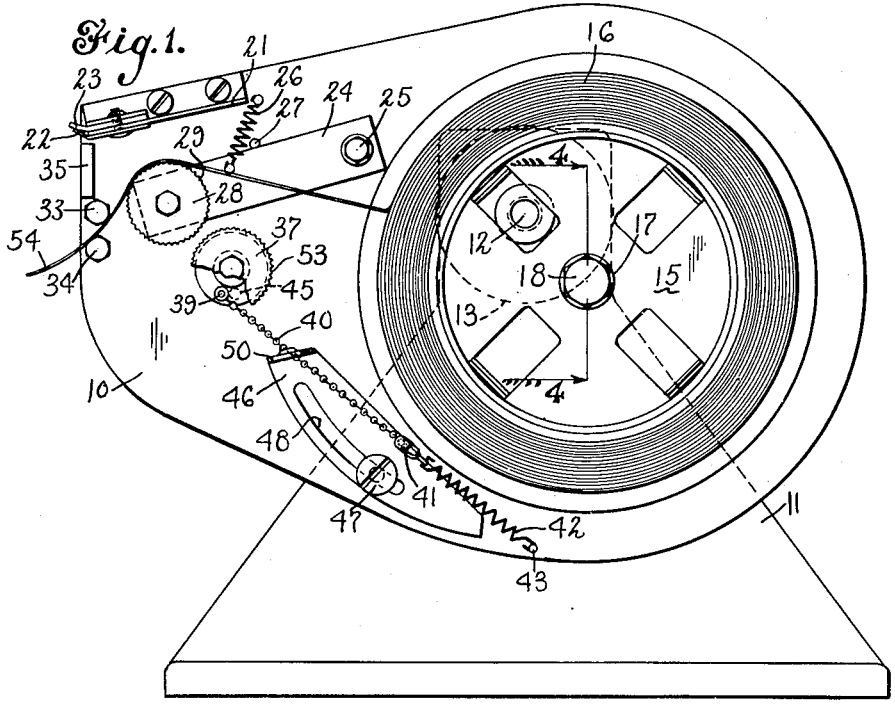
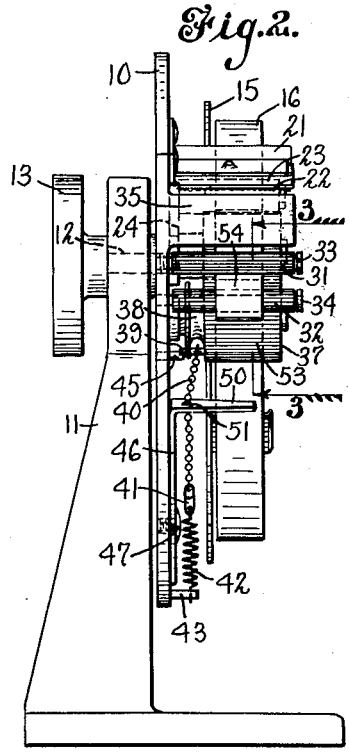
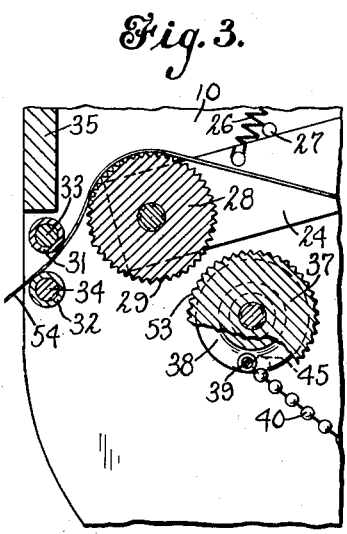
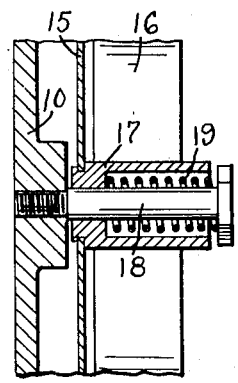
Inventor
Alfred P. Krueger
By Rockwell & Partholow
Attorneys

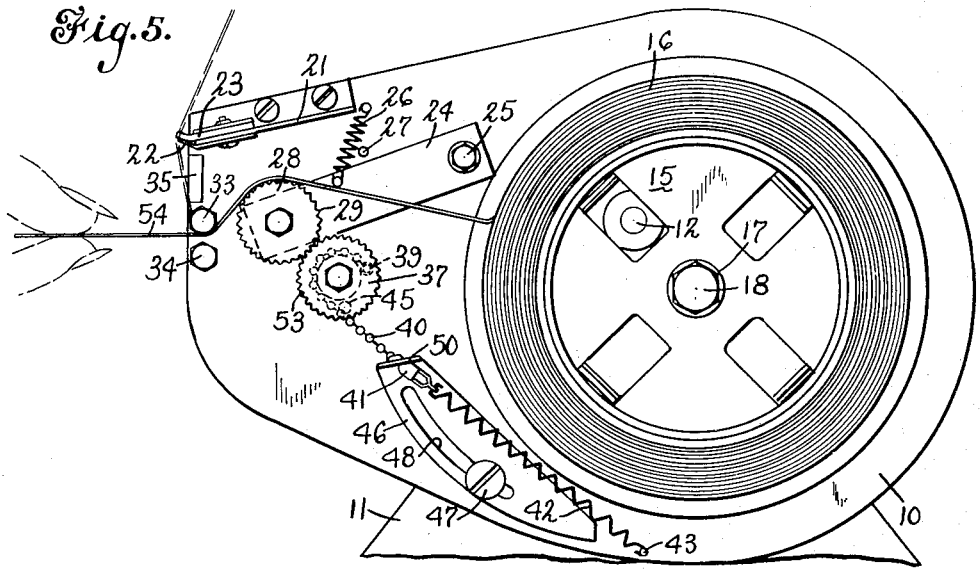
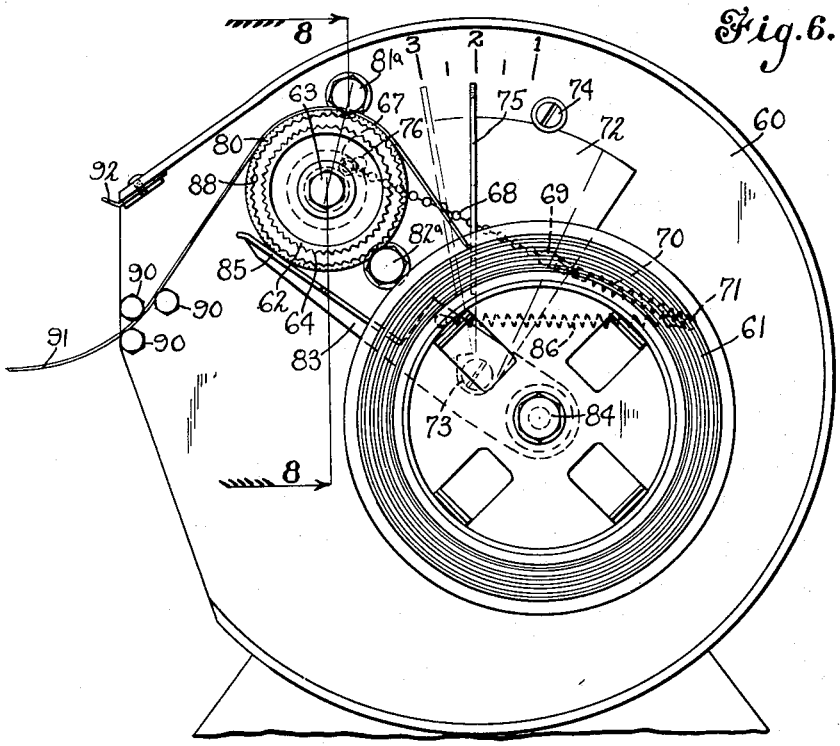

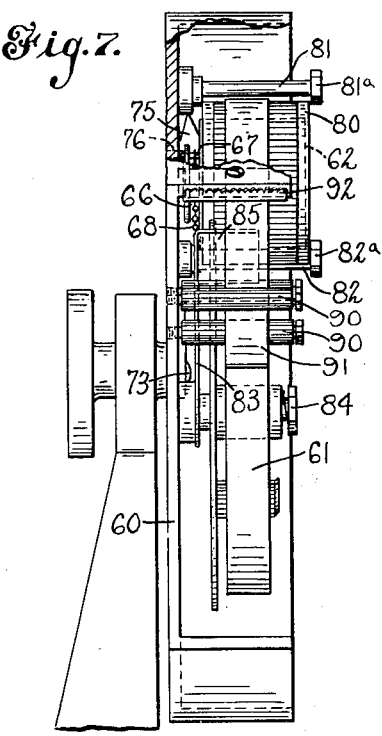
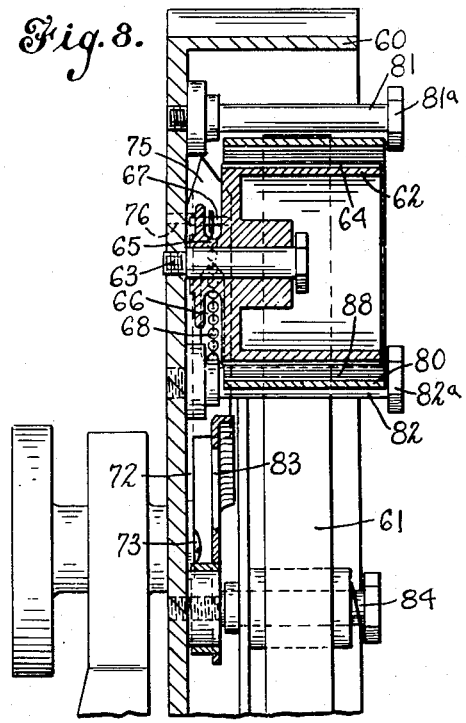
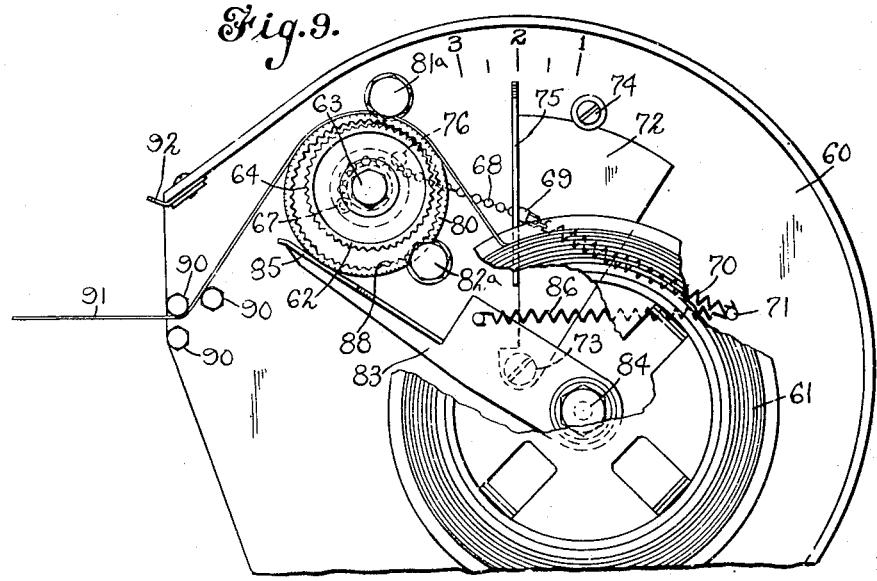

Oct. 26, 1954    A. P. KRUEGER    2,692,436
TAPE-DISPENSING MECHANISM
Filed Nov. 10, 1950    4 Sheets-Sheet 4

Inventor
Alfred P Krueger
By
Rockwell Bartholow
Attorneys

Patented Oct. 26, 1954

2,692,436

UNITED STATES PATENT OFFICE 2,692,436

TAPE-DISPENSING MECHANISM

Alfred P. Krueger, Stratford, Conn., assignor to Derby Sealers, Incorporated, Derby, Conn., a corporation of Connecticut Application November 10, 1950, Serial No. 194,980

8 Claims. (Cl. 33—131)

This invention relates to devices for dispensing tape and more particularly to devices of this character in which the tape is pulled or drawn from the roll by the operator upon grasping the exposed end of the tape as distinguished from similar devices wherein a tape-feeding mechanism is adapted to be operated by a lever or crank.

In the "pull" type apparatus for dispensing tape, such as is illustrated in the present application, if a measured length of tape is to be dispensed, it is necessary to provide some means to check the operation of the device when the desired length has been drawn from the machine by the operator. In some instances, this has been accomplished by providing a measuring roller with which the surface of the tape is in contact when the latter is drawn from the supply roll whereby the measuring roller is rotated by the travel of the tape thereover, and means is provided to check the forward movement of the roller when the desired length of tape has been drawn from the roll. It is usually necessary in such a construction to provide means whereby, at the end of a tape-dispensing operation, the tape will be disengaged from the roller in order to permit the latter to return to its original or starting position in order that, in a subsequent operation, an accurately measured length of tape can be dispensed.

It is contemplated by the present invention to eliminate the reverse rotation of the roller with which the tape is engaged so that it is not necessary to disengage the tape from this roller or relieve the frictional contact of the tape with the roller. In this construction, it will be understood that the present device may be employed either with pressure-sensitive tape or with so-called gummed tape.

To this end I have employed in the present construction a pair of rollers rotatably mounted in spaced relation so that the surface of one roller is normally out of contact with that of the other. One of these rollers may be termed a tape-contacting roller in that it is engaged by the surface of the tape as the latter is drawn from the supply roll and caused to rotate thereby. The other roller is a measuring roller, and the elements of the mechanism are so arranged that while these rollers are normally in spaced relation, when tension is applied to the tape to draw it from the roller, one will be moved into contact with the other so that the measuring roller will be caused to rotate by the rotation of the contact roller, and thus effect the measuring of the dispensed strip.

When the tension upon the tape is relieved, as, for example, when the dispensed length of tape is severed, the movable roller will be returned to its original position, thus permitting the measuring roller to rotate in a reverse direction to its starting position so as to be ready for a subsequent operation. With this arrangement, the tape may always be in contact with the roller with which it is engaged, and this roller will normally always rotate in a forward direction as reverse rotation is not necessary.

One object of the present invention is to provide a new and improved apparatus for dispensing tape such that an accurately measured length of tape will be dispensed.

A still further object of the invention is to provide an apparatus for dispensing a measured length of either gummed tape or pressure-sensitive tape, the device being so constructed that the tape is drawn over a rotatably mounted roller with which it is in constant contact.

A still further object of the invention is to provide a tape-dispensing machine of the character described having a tape-contacting roller and a measuring roller, the latter being rotated by the former which is in turn rotated by contact of the tape therewith as it is drawn from the roller.

A still further object of the invention is to provide a tape-dispensing apparatus of the character described having a tape-contacting roller and a measuring roller, the tape-contacting roller being rotated by contact of the tape therewith as it comes from the roll, and said roller being movably mounted so that upon the application of tension to the tape to draw it from the supply roll, it is moved into engagement with the measuring roller to effect rotation of the latter.

To these and other ends the invention consists in the novel features and combinations of parts to be hereinafter described and claimed.

In the accompanying drawings:

Fig. 1 is a side elevational view of a tape dispenser embodying my invention;

Fig. 2 is a front elevational view thereof;

Fig. 3 is an enlarged sectional view on line 3—3 of Fig. 2;

Fig. 4 is a sectional view on line 4—4 of Fig. 1;

Fig. 5 is a view similar to Fig. 1, showing the parts in the positions assumed by them when tape is being drawn from the roll;

Fig. 6 is a side elevational view of a modified form of my invention;

Fig. 7 is a front elevational view thereof, some parts being broken away for the sake of clearness;

Fig. 8 is an enlarged sectional view on line 8—8 of Fig. 6;

Fig. 9 is a view similar to Fig. 6 showing the parts in the positions occupied when a strip of tape is being drawn from the device;

Figure 10:
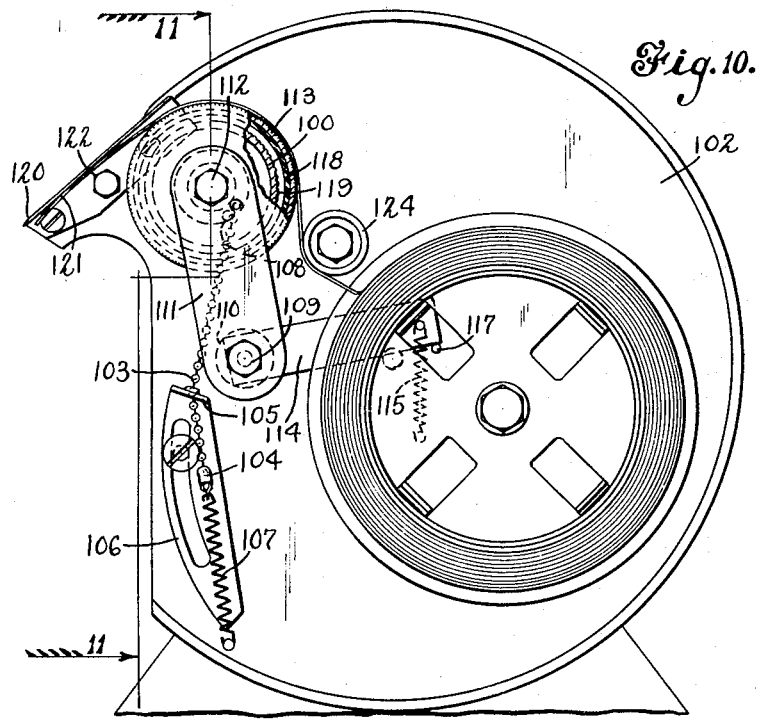
Fig. 10 is a side elevational view of a further modified form of my invention.

To illustrate one embodiment of my invention, I have shown in the drawings a tape-dispensing apparatus comprising a frame member or casing part 10 supported upon a standard 11. The frame member 10 may be provided with a spindle 12 passing through the standard to receive a thumb nut 13 so as to hold the frame in any desired rotative adjusted position on the standard 11.

Rotatably mounted upon the frame member 10 is a reel or support 15 for carrying a supply roll of tape 16. As shown in Fig. 4, the member 15 is provided with a hub 17 rotatably mounted on a headed bolt or screw 18 threaded into the frame member 10. The hub member 17 is hollow, and a compression spring 19 is mounted thereon which spring reacts between the bottom of the recess in the hub member and the head of the screw 18 to exert friction upon the reel holder 15 so as to place a drag thereon to frictionally resist rotation of the reel holder and the supply roll of tape. By adjustment of the screw 18 this friction can be adjusted to any amount desired and may usually be only sufficient to prevent free swinging or oscillating movement of the supply roll or overrunning thereof at the end of a tape-dispensing operation.

Secured to the frame member 10 adjacent the upper front portion thereof is a knife support 21 which carries a severing member 22 against which the end of the tape may be drawn to be severed, as shown in dotted lines in Fig. 5. Above the knife 22 a flat flexible strip of rubber or the like 23 may be secured to the support 21 to guard the edge of the blade during the operation of the device.

A link or strap 24 is pivoted to the frame member 10 adjacent one end thereof, as shown at 25, and a spring 26 tends to urge this member upwardly, as shown in Fig. 1, against a stop 27 which limits the upward movement of the member 24 about the pivot 25 leaving the free end to swing downwardly or in a counter-clockwise direction against the tension of the spring 26. Rotatably mounted upon the free end of the member 24 is a tape-contacting roller 28, this roller being provided with ribs or serrations 29 which extend along the surface of the roller parallel to its axis.

Forwardly of the roller 28 a pair of guide rollers 31 and 32 are rotatably mounted upon posts 33 and 34 secured to the member 10, and the space between the upper of these rollers, 31, and the severing member 22 may be closed by a guard member 35 so that there will be no likelihood of the operator attempting to reach the tape by extending his fingers within this space.

Below and slightly rearwardly of the tape-contacting roller 28, a measuring roller 37 is rotatably mounted upon the frame member 10, this roller being provided with an annular recess or groove 38 within which is disposed a pin 39 to which one end of a chain 40 is secured. At the other end of the chain there is provided an enlargement or stop 41, and this end of the chain is secured to one end of a tension spring 42, the other end of which is secured at 43 to the frame member 10. With this construction, as will be understood, the spring 42 tends to hold the roller 37 in the position shown in Figs. 1, 2 and 3, wherein the projecting end of the pin 39 abuts a stop pin 45 (Fig. 2) secured to the member 10. This is the normal rest or starting position of the roller 37 which serves as a measuring roller to measure the length of tape dispensed.

In order to determine the end or stop position of the roller 37 so as to determine the length of tape which is dispensed, a bracket 46 is adjustably secured to the frame member 10 by means of a screw 47 threaded into the frame member 10, which screw passes through an arcuate slot 48 in the bracket 46 so that the latter can be adjusted toward and from the roller 37 or with respect to the stop member 41 within the limits provided by the slot 48. At its upper end the bracket 46 is provided with a horizontally-extending arm 50 having an opening 51 therein through which the chain 40 passes freely. This opening is, however, not sufficiently large to permit the passage of the stop member 41, and hence rotation of the measuring roller 37 in a clockwise direction from the position shown in Figs. 1 and 3 will be limited by contact of the member 41 with the arm 50, as shown in Fig. 5. The adjustment of the member 46 and, therefore, of the arm 50 will vary the position at which the stop member will engage the arm 50 and, therefore, adjust the amount of rotation of the roller 37 in order to dispense strips of tape of varied length as desired.

The measuring roller 37 is also provided with longitudinal serrations or ribs 53 upon its surface and these ribs are adapted to cooperated with the ribs 29 of the roller 28 in meshing relation in the manner of gear teeth so that when the two rollers are in contact, rotation of one will effect rotation of the other.

The normal position of the parts is shown in Fig. 1 where, as will be seen, a free end of the tape extends from the supply roll 16 over and in contact with the roller 28, and from there the tape extends between the rollers 31 and 32 so that a free end 54 projects forwardly from the rollers 31 and 32 to be grasped by the fingers of the operator. At this time the tension spring 26 holds the roller 28 in the position shown in Figs. 1 and 3 where it is out of engagement with the measuring roller 37. If it is desired to draw tape from the roll, the operator pulls upon the free end 54 of the tape, as shown in full lines in Fig. 5. The tension thus applied to the tape will draw the free end of the member 24 downwardly or in a counter-clockwise direction so as to bring the ribs 29 of the tape-contacting roller 28 into meshing relation with the ribs 53 of the measuring roller 37, as shown in Fig. 5. A continued pull on the tape will effect rotation of the roller 28 and also of the measuring roller 37 until the parts reach the position shown in Fig. 5 in which the stop member 41 is in engagement with the arm 50.

Further rotation of the measuring roller 37 will then be prevented and likewise further rotation of the tape-contacting roller 28 so that the operator will have dispensed a measured length of tape from the supply roll, the length having been previously determined by the setting or adjustment of the bracket 46.

The tape is then drawn upwardly against the severing member 22 and severed thereon. This relieves the tape of tension which has been previously applied thereto by the operator, and upon release of this tension, the spring 26 moves the member 24 in a clockwise direction about its pivot 25 and disengages the ribs of the roller 28 from those of the measuring roller 37. This leaves the latter free to rotate in a counter-clockwise direction, and it is rotated in this direction by the spring 42 to its initial or starting position, that is, the position in which the pin 39 contacts the stop pin 45. The parts are now ready for a subsequent operation with a free end 54 of the tape projecting from the machine to be grasped by the operator.

If pressure-sensitive tape is employed in the apparatus, the tacky side of the tape will be in engagement with the roller 28 and the non-tacky side will contact the roller 31 which later acts as a guide roller in order that the path of the tape be such that when tension is applied thereto the tape-contacting roller 28 will at once be moved downwardly against the measuring roller 37. It will be understood, however, that the apparatus may be employed with gummed tape as well as with pressure-sensitive tape, the position of the rollers 28 and 31 being such that the roller 28 will be rotated by friction of the gummed tape therewith.

When pressure-sensitive tape is employed in the apparatus it will be found that a certain amount of the gum or tacky material will build up upon the severing member notwithstanding the fact that this member contacts the non-tacky side of the tape. As a result, it is found that in the use of the device the unsevered portion of the tape or the end of the portion remaining upon the roll will tend to cling to the severing member after the severing operation. This undesirable occurrence is prevented by the present apparatus for, when the tape-contacting roll is moved to its normal or rest position after the severing operation, it will tend to strip the tape from the knife or severing blade. As will be seen from Fig. 5, when the roller 28 moves upwardly, the length of the tape strip between the supply roll 16 and the roller 31 must be increased and the effect will be to draw the extreme end of the tape away from the severing blade.

In Figs. 6 to 9 of the drawings, I have shown a modification of my invention wherein the tape-contacting roller and the measuring roller are concentric and so arranged that, upon the drawing of tape from the machine, the inner ribbed surface of the tape-contacting roller will be caused to engage the cooperating outer surface of the measuring roller and thus effect the measuring of the dispensed strip. In this form of my invention the frame 60 rotatably supports the supply roll of tape 61 as before and a measuring roller 62 is rotatably mounted upon a stud or pin 63 secured to the frame member 60, this roller being provided with ribs 64 upon its outer surface.

The measuring roller 62 is also provided with a hub 65 (Fig. 8) having an annular recess 66 within which is a pin 67 to which is secured one end of a chain 68. The other end of the chain carries the enlargement or stop 69 and is secured to one end of a spring 70, the other end of which is secured to the frame member 60 at 71.

A stop member 72 in the form of a sector is pivoted to the frame at 73 so that its position may be adjusted, and this member is held in adjusted position by the head of the screw 74 threaded into the frame 60. The member 72 is provided with a laterally-extending flange 75 through which the chain 68 extends so as to determine the length of tape which is dispensed in a manner similar to that previously described in connection with the modification shown in Figs. 1 to 5. That is, as shown in Fig. 9, the stop member 69 contacts the flange 75 and thus limits the rotation of the measuring roller 62 in a counter-clockwise direction. Rotation of this member in a clockwise direction is limited by a pin 76 secured to the frame and engaging the pin 67, as previously described, to determine the initial or starting position of the parts.

Surrounding the measuring roller 62 is a hollow tape-contacting roller 80, the outer surface of which is engaged by the tape as it comes from the supply roll 61. This roller is normally held in a floating position concentric with the measuring roller 62 against a pair of posts 81 and 82 secured to the frame member 60 by an arm 83 pivoted at 84 to the frame. These posts have enlarged heads 81ª and 82ª to limit endwise movement of the roller. The arm 83 is provided with a relatively wide forward end or shoe 85 which contacts the outer surface of the tape-contacting roller 80 to urge it against the posts 81 and 82, as shown in Fig. 6. The arm 83 is urged to this position or in a clockwise direction about its pivot 84 by a tension spring 86 (Fig. 9) secured at one end to the arm 83 and secured at the other end to pin 71 on the frame. Normally the parts are in the position shown in Fig. 6 wherein the tape-contacting roller is substantially concentric with, and out of contact with, the measuring roller 62.

The tape-contacting roller is provided upon its inner surface with ribs 88 adapted to mesh with the ribs 64 of the measuring roller 62 when the tape is being drawn from the machine.

Guide rollers 90 are carried upon the frame 60 adjacent the front end thereof between which the tape is drawn, and forwardly of which the free end 91 of the tape extends, as is shown in Fig. 6, so that it may be grasped by the operator and manually pulled from the machine.

The normal position of the parts is shown in Fig. 6 in which it will be noted that the tape-contacting roll and the measuring roll are in concentric relation so that the internal ribs upon the tape-contacting roll are out of engagement with the external ribs upon the measuring roll. When the operator applies tension to the tape to draw it from the machine, the tape-contacting roll is moved downwardly against the pressure of the member 83 and tension of the spring 86 to the position shown in Fig. 9 wherein the ribs of one roller mesh with those of the other. Continued pull upon the tape will effect rotation of the tape-contacting roll 80, and through the engaging ribs will also effect rotation of the measuring roll, thus winding the chain 68 about the hub of the measuring roller until the stop member 69 is engaged with the flange 75 of the adjustable sector 72, as shown in Fig. 9. Movement of the tape-contacting roll 80 will then be checked, and a measured length of tape will have been dispensed which will be then severed against the severing member 92 secured to the supporting frame 60.

When the tape has been severed and tension on the tape thereby relieved, the arm 83 will be moved in a clockwise direction by its spring 86 and thus move the tape-contacting roller upwardly and rearwardly against the posts 81 and 82 to the concentric position shown in Fig. 6, thus releasing the measuring roller 62 and permitting it to be rotated in a reverse direction to its initial or starting position by the spring 70.

Figure 11:
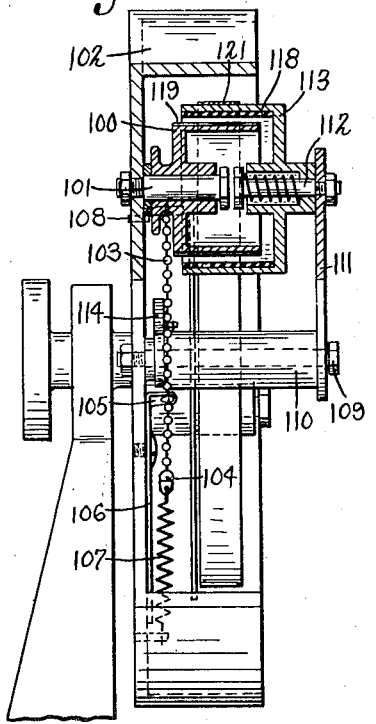
Fig. 11 is a sectional view on line 11—11 of Fig. 10.
Figure 12:
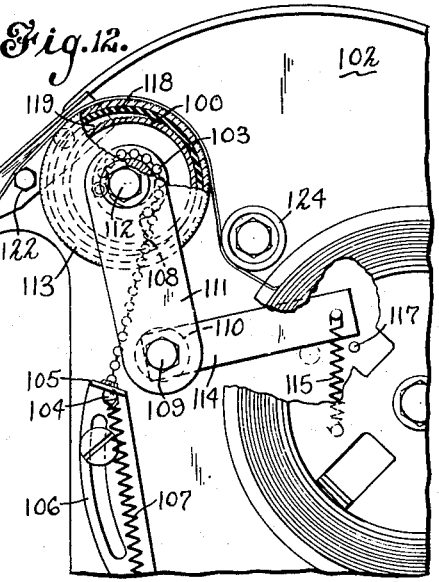
Fig. 12 is a fragmentary view similar to Fig. 10 showing the parts in the positions occupied when a strip of tape is being drawn from the roll.

In Figs. 10 to 12 of the drawings, I have shown a further modification similar in many respects to the two modifications previously described. In this modification of my invention, a measuring roll 100 is rotatably mounted upon a stud 101 secured to the supporting frame member 102, and a chain 103 is secured to the hub of this roller and carries an enlargement 104 to cooperate with an arm 105 upon a plate 106 adjustably mounted on the frame member 102 as previously described in connection with the plate or bracket 46, shown in Fig. 1. A spring 107 normally urges the measuring roller in a clockwise direction, as shown in Fig. 10, its position being limited by a stop pin 108 which acts in a manner similar to the stop pin 45.

Rotatably mounted upon a pin 109 secured to the frame 102 is a collar 110. To the outer end of this collar is rigidly secured an arm 111 provided with a pin 112 upon which is rotatably mounted a tape-contacting roller 113 normally held in a position concentric with, and out of contact with, the measuring roller 100.

Upon the other end of the collar 110 is rigidly secured an arm 114, which arm is normally urged by a spring 115 in a clockwise direction against a stop pin 117 secured to the frame 102. When the arm 114 is against the stop pin, as shown in Fig. 10, the two collars are substantially concentric with each other and their adjacent surfaces are out of contact with each other.

Upon the inner surface of the tape-contacting roller 113 is provided a covering of frictional material 118 such as rubber, for example, and the outer surface of the roller 100 is provided with axially-extending ribs 119 so that when the rolls are drawn into contact, as shown in Fig. 12, rotation of the tape-contacting roll 113 will effect rotation of the measuring roller as before.

A severing knife 120 is provided at the forward end of the frame member 102 and, as shown in Fig. 12, the free end 121 of the tape is drawn outwardly between the lower surface of this member and a guide roller 122 rotatably carried by the frame.

A guide roller 124 is also rotatably carried by the frame so as to determine the direction of the tape as it approaches the tape-contacting roller 113, and thus give the tape a considerable wrap about this roller, it being understood that if pressure-sensitive tape is being dispensed, the non-tacky side of the tape will engage the guide roller 124 while the tacky side of the tape will engage the tape-contacting roller 113.

The normal position of the parts is shown in Fig. 10 wherein the tape-contacting roll and measuring roll are in concentric relation out of engagement with each other, the tape-contacting roll being held in this position by the spring 115. The operator may extend his finger under the severing member 120 and engage it with the lower surface of the tape (which in the case of pressure-sensitive tape is the tacky surface) and apply tension to the tape to draw it from the supply roll. This serves to exert a forward and downward pressure upon the tape-contacting roll 113 so as to cause the arm 111, upon which this roll is carried, to swing to the position shown in Fig. 12 in which the inner frictional surface 118 of the roll 113 will contact the outer ribber surface of the measuring roll 100. A continued pull upon the tape will serve to rotate the roller 113 and also the measuring roller 100 until rotation of both rolls is stopped by engagement of the stop member 104 with the bracket part 105 at which time the desired length of tape will have been dispensed.

The tape is then severed against the severing member 120, as shown in dotted lines in Fig. 12, and thereby the tension upon the tape is released. At this time the spring 115 will move the arm 111 and the tape-contacting roller 113 back to the initial or starting positions of these parts shown in Fig. 10, and the measuring roller 100, being thereupon released from engagement with the tape-contacting roller, will be returned to its starting position by the spring 107 ready for a subsequent operation.

While I have shown and described some preferred embodiments of my invention, it will be understood that it is not to be limited to all of the details shown, but is capable of modification and variation within the spirit of the invention and within the scope of the claims.

What I claim is:

1. In a tape-dispensing apparatus, a support, a tape-contacting roller mounted on the support for rotational movement and for movement in a direction transverse to its axis, a measuring roller rotatably mounted on the support externally of the first roller and normally standing with its outer surface in spaced relation to that of the first-named roller, a support for a supply roll of tape mounted in position to direct the tape over the tape-contacting roller, and means whereby tension applied to the tape to draw it from the roll first moves the outer surface of said tape-contacting roller into engagement with the outer surface of said measuring roller and thereafter effects rotation of the measuring roller, and means to effect reverse rotation of the latter.

2. In a tape-dispensing apparatus, a support, a supply roll of tape mounted thereon, a measuring roller rotatably mounted on the support, a tape-contacting roller over which the tape is trained as it comes from the supply roll to be rotated by contact of the tape therewith, said last-named roller being external to the first and having its outer surface in spaced relation to that of the measuring roller, means mounting said last-named roller for bodily movement into engagement with the measuring roller by pressure of the tape thereon upon tension being applied to the tape to draw it from the roll and thereby effect rotation of the measuring roller in one direction, and means to effect reverse rotation of the measuring roller.

3. In a tape-dispensing apparatus, a support, a supply roll of tape mounted thereon, a measuring roller rotatably mounted on the support, a tape-contacting roller over which the tape is trained as it comes from the supply roll to be rotated by contact of the tape therewith, said last-named roller being external to the first and having its outer surface in spaced relation to that of the measuring roller, means mounting said last-named roller for bodily movement into engagement with the measuring roller by pressure of the tape thereon upon tension being applied to the tape to draw it from the roll and thereby effect rotation of the measuring roller, means for limiting rotation of the measuring roller in one direction, and means to effect reverse rotation of the measuring roller.

4. In a tape-dispensing apparatus, a support, a supply roll of tape mounted thereon, a measuring roller rotatably mounted on the support, a tape-contacting roller over which the tape is trained as it comes from the supply roll to be rotated by contact of the tape therewith, said last-named roller being external to the first and having its outer surface in spaced relation to that of the measuring roller, means mounting said last-named roller for bodily movement to bring its outer surface into engagement with the outer surface of the measuring roller by pressure of the tape thereon upon tension being applied to the tape to draw it from the roll and thereby effect rotation of the measuring roller, means for limiting rotation of the measuring roll, means normally urging the tape-contacting roller in a direction away from the measuring roller, and means for effecting reverse rotation of the measuring roller.

5. In a tape-dispensing apparatus, a support, a supply roll of tape mounted thereon, a measuring roller rotatably mounted on the support, a tape-contacting roller over which the tape is trained as it comes from the supply roll to be rotated by contact of the tape therewith, said last-named roller being external to the first and having its outer surface in spaced relation to that of the measuring roller, means mounting said last-named roller for bodily movement to bring its outer surface into engagement with the outer surface of the measuring roller by pressure of the tape thereon upon tension being applied to the tape to draw it from the roll and thereby effect rotation of the measuring roller in one direction, means for limiting rotation of the measuring roll, means normally urging the tape-contacting roller in a direction away from the measuring roller, and means for reversely rotating said measuring roller when the tape-contacting roller is disengaged therefrom.

6. A tape-dispensing apparatus as in claim 5 wherein the tape-contacting roller is mounted on an arm pivoted to the support.

7. A tape-dispensing apparatus as in claim 5 wherein the tape-contacting roller is mounted on an arm pivoted to the support and a spring urges said arm in a direction to hold the rollers in spaced relation.

8. A tape-dispensing apparatus as in claim 5 wherein the outer surfaces of the rollers are provided with interengaging members to effect rotation of the measuring roller when the tape-contacting roller is rotated.

References Cited in the file of this patent

UNITED STATES PATENTS

| Number | Name | Date |
|---|---|---|
| 2,291,668 | Weigolt | Aug. 4, 1942 |
| 2,408,363 | Beckman et al. | Oct. 1, 1946 |
| 2,553,658 | Larson | May 22, 1951 |
| 2,621,737 | Ledig | Dec. 16, 1952 |